United States Patent
Delaney et al.

(10) Patent No.: US 7,260,086 B2
(45) Date of Patent: *Aug. 21, 2007

(54) METHODS AND SYSTEMS FOR GLOBAL TITLE TRANSLATION USING MESSAGE ORIGINATION INFORMATION

(75) Inventors: Robert J. Delaney, Raleigh, NC (US); Todd Eichler, Wake Forest, NC (US)

(73) Assignee: Tekelec, Morrisville, NC (US)

( * ) Notice: Subject to any disclaimer, the term of this patent is extended or adjusted under 35 U.S.C. 154(b) by 1014 days.

This patent is subject to a terminal disclaimer.

(21) Appl. No.: 10/397,774

(22) Filed: Mar. 26, 2003

(65) Prior Publication Data
US 2004/0141493 A1 Jul. 22, 2004

Related U.S. Application Data

(63) Continuation-in-part of application No. 10/345,632, filed on Jan. 16, 2003, now Pat. No. 7,088,728.

(51) Int. Cl.
*H04L 12/66* (2006.01)
*H04M 7/00* (2006.01)

(52) U.S. Cl. .............. 370/352; 370/389; 370/467; 370/410; 370/426; 379/229

(58) Field of Classification Search ............... None
See application file for complete search history.

(56) References Cited

U.S. PATENT DOCUMENTS 4,752,924 A 6/1988 Darnell et al.
5,008,929 A 4/1991 Olsen et al.
5,384,840 A 1/1995 Blatchford et al.
5,481,673 A 1/1996 Michelson
5,592,477 A 1/1997 Farris et al.
5,592,530 A 1/1997 Brockman et al.
5,708,702 A 1/1998 De Paul et al.
5,898,667 A 4/1999 Longfield et al.

(Continued)

FOREIGN PATENT DOCUMENTS

EP 0 912 068 A2 4/1999

(Continued)

OTHER PUBLICATIONS

European Search Report in European Application No. EP 04 70 2535 (Apr. 10, 2006).

(Continued)

*Primary Examiner*—Wellington Chin
*Assistant Examiner*—Soo D. Hyun
(74) *Attorney, Agent, or Firm*—Jenkins, Wilson, Taylor & Hunt, P.A.

(57) ABSTRACT

Methods and systems for message-origination-based global title translation include receiving a signaling message and determining whether global title translation is required. In response to determining that global title translation is required, a lookup is performed in the global title translation database. The lookup is based on the called party address and the originating point code in the signaling message. The destination point code from the global title translation is inserted in the signaling message. The signaling message is then routed to its intended destination based on the destination point code and optionally the originating point code in the signaling message.

25 Claims, 7 Drawing Sheets

U.S. PATENT DOCUMENTS

| | | | |
|---|---|---|---|
| 6,175,574 B1 | 1/2001 | Lewis | |
| 6,226,289 B1 | 5/2001 | Williams et al. | |
| 6,282,191 B1 | 8/2001 | Cumberton et al. | |
| 6,327,267 B1 * | 12/2001 | Valentine et al. | 370/466 |
| 6,327,270 B1 | 12/2001 | Christie et al. | |
| 6,535,746 B1 | 3/2003 | Yu et al. | |
| 6,757,538 B1 | 6/2004 | Howe | |
| 6,792,100 B2 * | 9/2004 | Nekrasovskaia et al. | 379/230 |
| 6,842,506 B1 | 1/2005 | Bedingfield | |
| 7,088,728 B2 * | 8/2006 | Delaney et al. | 370/410 |
| 2002/0071543 A1 | 6/2002 | Williams | |
| 2002/0131427 A1 | 9/2002 | Niermann | |
| 2002/0186702 A1 | 12/2002 | Ramos et al. | |
| 2003/0206562 A1 | 11/2003 | Yi | |
| 2004/0114533 A1 | 6/2004 | Angermayr et al. | |
| 2004/0137904 A1 | 7/2004 | Gradischnig | |

FOREIGN PATENT DOCUMENTS

| | | |
|---|---|---|
| EP | 1 111 940 A1 | 6/2001 |
| WO | WO97/11563 | 3/1997 |
| WO | WO99/67928 | 12/1999 |

OTHER PUBLICATIONS

Supplementary European Search Report in European Application No. EP 04 70 2535 (Mar. 22, 2006).

Supplementary European Search Report in European Application No. EP 04 70 2497 (Feb. 13, 2006).

Notification Concerning Transmittal of International Preliminary Report on Patentability (Chapter 1 of the Patent Cooperation Treaty) in International Application No. PCT/US2004/001004 (Aug. 4, 2005).

Notification of Transmittal of the International Search Report and the Written Opinion of the International Searching Authority, or the Declaration in International Application No. PCT/US04/00999 (Apr. 6, 2005).

* cited by examiner

METHODS AND SYSTEMS FOR GLOBAL TITLE TRANSLATION USING MESSAGE ORIGINATION INFORMATION

RELATED APPLICATIONS

This application is a continuation-in-part of U.S. patent application Ser. No. 10/345,632, filed Jan. 16, 2003 now U.S. Pat. No. 7,088,728, the disclosure of which is incorporated herein by reference in its entirety.

TECHNICAL FIELD

The present invention relates to methods and systems for global title translation. More particularly, the present invention relates to methods and systems for global title translation based on message origination information.

BACKGROUND ART

Within a signaling system 7 (SS7) network, the signaling connection control part (SCCP) protocol is used for accessing databases and other entities within the network. The SCCP protocol also provides an advanced addressing capability where a subsystem is represented as an array of digits known as a global title address. By utilizing global title address translation, the SS7 point code (PC) and subsystem number (SSN) of a final destination are not required to be known by the message originator. All the originator is required to know is the called party dialed digits and the address of a node that can perform the global title translation. Global title translation is commonly employed to locate databases that provide 800 number toll free and caller ID services within telecommunications networks. Depending on network topology, global title translation processing is typically performed at a signal transfer point (STP), a signaling gateway (SG), or a service control point (SCP) where one network makes an inter-connection to an adjacent network.

The addressing information used to facilitate message routing at the SCCP level commonly includes a destination point code, a subsystem number, and optionally a global title. If a destination PC and SSN are not specified in the SCCP portion of an SS7 message, global title translation may be used to resolve a global title address contained in the message to a destination point code and subsystem number or optionally another global title address. In an SCCP message, the called party address field contains a routing indicator to instruct network routing entities, such as STPs, to route on either point code and subsystem number or global title address. If the routing indicator identifies the message as requiring routing based on a global title address, the called party address is submitted for global title translation to produce a new destination address, which may be the local node or a different node in the network. In the case of an intermediate GTT, the receiving node may translate the global title address information in the message again.

Currently, there are two forms of GTT, intermediate and final GTT. Intermediate GTT involves performing GTT processing on a message at a first network node, such as an STP, and routing the translated message from the STP with the routing indicator set to route-on-gt for further GTT processing by a second network node. Final GTT involves performing GTT processing on an SCCP message at a first network node, such as an STP, and routing the translated message based upon point code-ssn to the appropriate destination or terminating network node, such as a database application. In both GT translation scenarios, there is a need to better discriminate both intermediate and final GTT based upon who is sending the message. Accordingly, there exists a long-felt need for improved methods and systems for global title translation in telecommunications networks.

DISCLOSURE OF THE INVENTION

The invention described herein allows network operators to selectively send both intermediate GTT messages and final GTT messages to different networks based on business arrangements, desired class of service, or other factors.

Commonly-assigned, co-pending U.S. patent application Ser. No. 10/345,632 filed Jan. 16, 2003 and entitled Methods and Systems for Associating a Plurality of Different Routes with the Same Destination and for Selectively Routing Signaling Messages to the Destination Over the Different Routes Using Message Origination Information Associated with Non-Adjacent Signaling Nodes, discloses systems and methods for enabling a network operator to select a route to the same destination point code (DPC) based upon the origin of the message being routed. The present invention allows a network operator to configure a network such that two SCCP messages containing the same global title address information may be routed to different DPCs based upon the origin of the message being routed. For example, messages from different OPCs with the same global title addresses may be global title translated to yield different DPCs.

According to one aspect, the present invention includes a method for global title translation in a telecommunications network. According to the method, a signaling message is received at a routing node, such as a signal transfer point. The routing node determines whether the signaling message requires global title translation. In response to determining that the signaling message requires global title translation, a lookup is performed in a global title translation database. The lookup may be performed based on a called party address and an originating point code extracted from the signaling message. Because the global title translation depends on the originating point code, messages from different originating point codes having the same global title address can be treated differently. This allows different network operators to establish agreements as to how their traffic will be global title translated.

Accordingly, it is an object of the present invention to provide improved methods and systems for global title translation in a telecommunications network.

It is another object of the invention to provide methods and systems for global title translation using message origination information.

It is yet another object of the invention to provide improved methods and systems for message-origination-based global title translation and, after the message-origination-based global title translation, for message routing based on message origination information.

Some of the objects of the invention having been stated hereinabove, and which are addressed in whole or in part by the present invention, other objects will become evident as the description proceeds when taken in connection with the accompanying drawings as best described hereinbelow.

BRIEF DESCRIPTION OF THE DRAWINGS

Preferred embodiments of the invention will now be described with reference to the accompanying drawings of which.

DETAILED DESCRIPTION OF THE INVENTION

Exemplary Message Routing Scenarios

Figure 1:
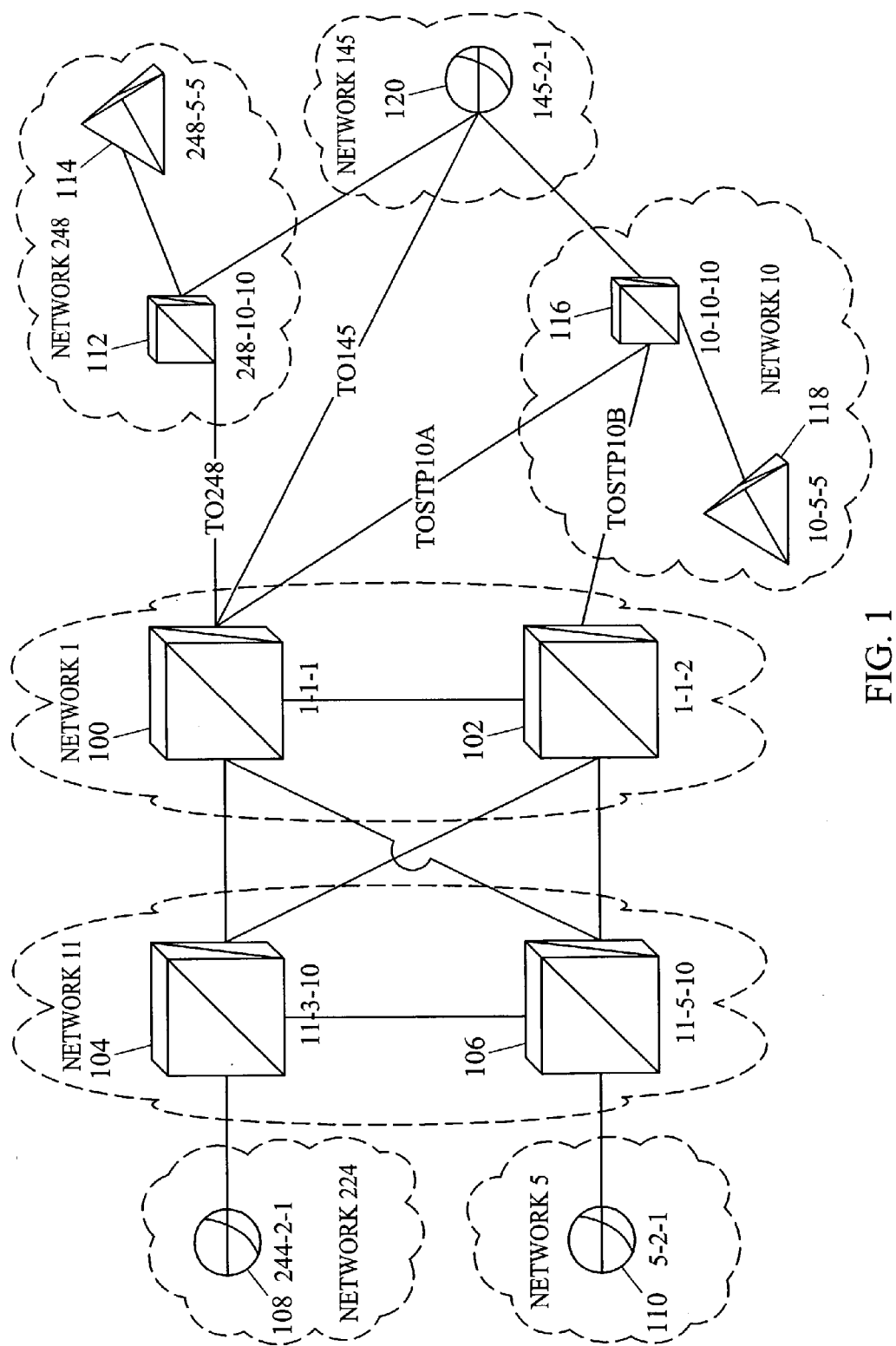
FIG. 1 is a network diagram illustrating an SS7 network in which global title translation is utilized.

FIG. 1 illustrates an SS7 network in which message-origination-based global title translation according to the present invention may be implemented. In FIG. 1, the SS7 network is divided into many sub-networks based on the service providers that own or operate the various nodes in the network. In the illustrated example, each network is numbered in a manner corresponding to the network portion of the point codes of the nodes in each network. For example, network 1 includes STPs 100 and 102 having point codes 1-1-1 and 1-1-2. Similarly, network 11 includes STPs 104 and 106 having point codes 11-3-10 and 11-5-10. Network 244 includes an SSP 108 having a point code of 244-2-1. Similarly, network 5 includes an SSP 110 having a point code of 5-2-1. Network 248 includes an STP 112 having a point code of 248-10-10 and SCP 114 having a point code of 248-5-5. Network 10 includes an STP 116 having a point code of 10-10-10 and an SCP 118 having a point code of 10-5-5. Finally, network 145 includes an SSP 120 having a point code of 145-2-1.

In the network illustrated in FIG. 1, a network operator owning STP pair 100 and 102 may desire to route GTT messages based upon the network that originates the message. For example, if a person calls from his phone via end office 108 and is placing a call that requires database queries, there may be business arrangements between the owners of network 1, network 11, network 248, and network 10 so that these queries are routed in a particular manner. For example, these business arrangements may require that messages requiring global title translation be translated and routed differently based on the origins of the messages.

Intermediate and final GTT lookups yield a destination point code that is placed in the MTP3 layer of a signaling message for routing. The DPC may correspond to an intermediate node or a final destination. Currently, the DPC can be selected based on several SCCP message parameters including global title address (GTA), translation type (TT), routing indicator (RI), nature of address indicator (NAI), and numbering plan (NP). The GTI parameter may be used to determine which GTT selector parameters are present in a received SCCP message. The selector parameters, such as TT, NP, and NAI, may then be used to select a GTT table for performing the global title translation. In conventional GTT, the lookup in the GTT table was performed solely based on the global title address. According to the present invention, the OPC or other message origination information may be used in combination with the global title address to perform the lookup in the GTT table. The present invention includes adding the OPC parameter from the routing label or calling party address (CgPA) field as an additional discriminator for determining the DPC during GTT processing.

Figure 2:
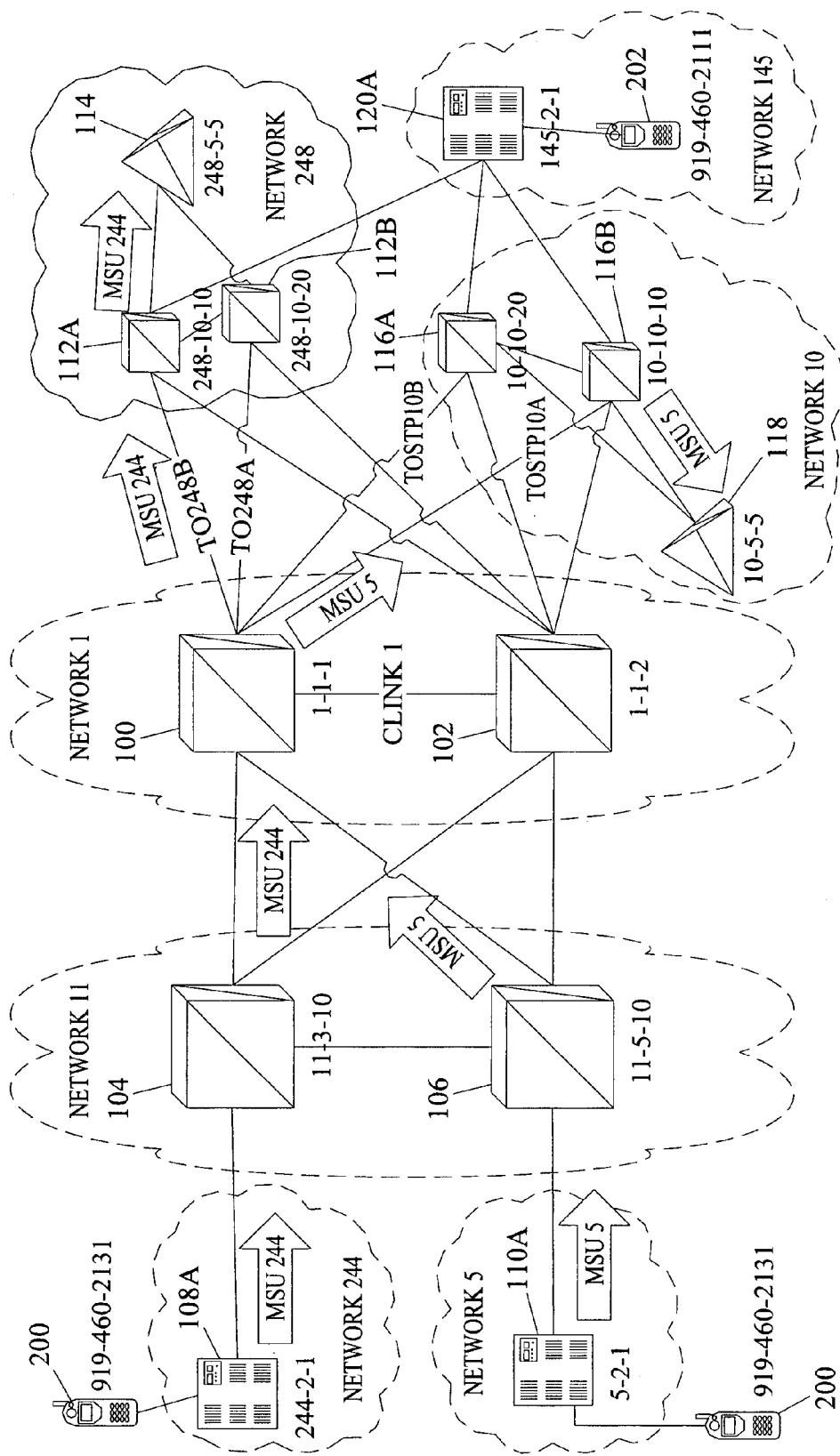
FIG. 2 is a network diagram illustrating intermediate global title translation using message origination information according to an embodiment of the present invention.

FIG. 2 is a message flow diagram illustrating exemplary message flows associated with intermediate global title translation according to an embodiment of the present invention. FIG. 2 is similar to the network illustrated in FIG. 1. However, in FIG. 2, STP 112 has been replaced by STPs 112A and 112B. Similarly, STP 116 has been replaced by STP pair 116A and 116B. End offices 108 and 110 have been replaced by mobile switching centers (MSCs) 108A and 108B. In addition, calling and called party mobile terminals 200 and 202 are illustrated.

In FIG. 2, a caller having a directory number of 919-460-2131 originates a call from mobile terminal 200 to 919-460-2111. The call is assumed to require a database lookup (e.g., a calling name service (CNAM) lookup). The call originates in network 244 as MSU 244 via MSC 108. MSU 244 is intermediate GTT'd at STP 104 and sent to STP 100. The network operator who owns STP 100 contracts with the owners of networks 244 and 248 to deliver CNAM queries from network 244 to the SCP in network 248. Accordingly, the owner of STP 100 may configure STP 100 to perform intermediate global title translation on messages from network 244 that require CNAM lookups so that the resulting point code in the messages is that of STPs 112A or 112B. STPs 112A and 112B may then perform final GTT on the messages such that the resulting DPC in the messages is that of SCP 114. Since the call originated in network 244, and the message is global title translated based on the origin, the query is sent to network 248's CNAM SCP 114.

In this example, it is assumed that caller 200 travels to another location served by network 5 instead of network 244. Then, caller 200 again originates a call to 919-460-2111 that requires a database lookup, but now the message must be processed by MSC 110A instead of MSC 108A. The process is the same as described above, but since the call originated from network 5, STP 100 global title translates and routes the call to Network 10's STPs 116A and 116B. In this example, it is assumed that the owner of network 1 contracted with the owners of network 5 and network 10 to deliver CNAM queries originating from network 5 to network 10's STPs 116A and 116B. This business relationship may be implemented by configuring the global title translation tables in STP 100 to perform intermediate global title translation for calls from 5-2-1 that require a CNAM lookup such that the DPC resulting from the GTT is that of STP 116A or 116B. STP 116A and 116B may then final GTT the message such that the DPC is that of SCP 118.

Using conventional GTT, the processing scenario illustrated in FIG. 2 would not be possible because messages having the same global title address of 919-460-2111 would be global-title-translated to the same DPC. However, because the present invention uses message origination information as an additional GTT discriminator, messages with different origins but the same global title addresses can be global-title-translated to different destinations.

Figure 3:
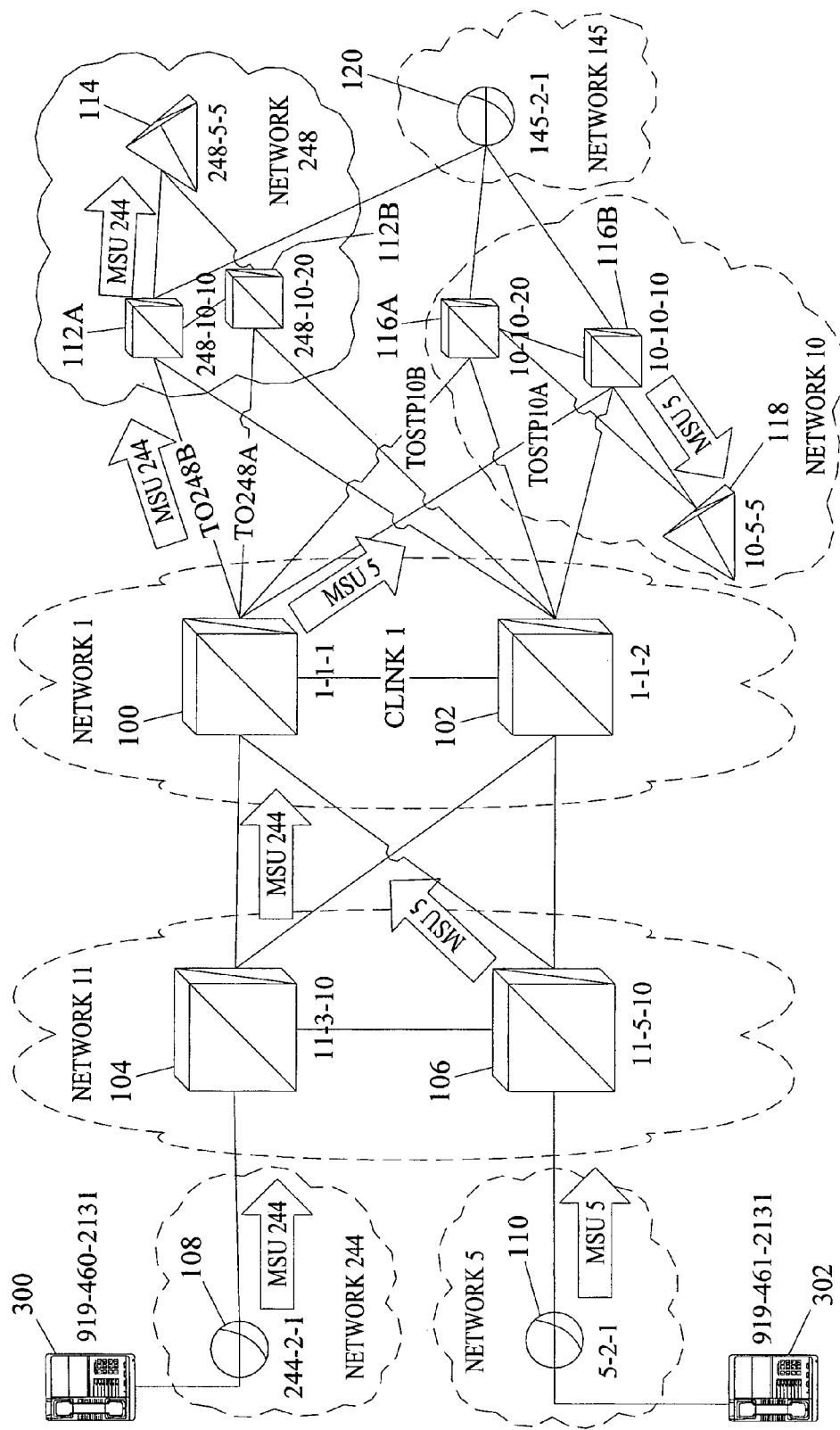
FIG. 3 is a network diagram illustrating final global title translation using message origination information according to an embodiment of the present invention.

FIG. 3 is a message flow diagram illustrating exemplary messaging associated with message-origination-based final GTT according to an embodiment of the present invention. In FIG. 3, it is assumed that a wireline subscriber 300 places a call to 919-460-2111 from one end office using a particular directory number, and another subscriber 302 at a different end office places a call to the same number.

In FIG. 3, wireline caller 300 originates a call from end office 108 to 919-460-2111 that requires a database lookup (e.g. a CNAM lookup). MSU 244 is intermediate GTT'd at STP 11-3-10 and sent to STP 1-1-1. The network operator who owns STP 100 contracts with the owners of networks 244 and 248 to deliver CNAM queries originating from network 244 to network 248. The owner of STP 100 may implement this relationship by configuring the global title translation tables in STP 100 to final-GTT messages from network 244 to SCP 114. Since the call originated in network 244, the query is sent to network 248's CNAM SCP 114.

Caller 302 at end office 110 originates a call to 919-460-2111 that requires a database lookup (e.g., a CNAM lookup). Since the call originated from network 5, STP 100 global title translates and routes the message to network 10's STPs 116A and 116B. In this example, it is assumed that the owners of network 1 contract with the owners of network 5 and network 10 to deliver LIDB queries originating from network 5 to network 10's STPs 116A and 116B.

As stated above, using conventional global-title-address-based GTT, the differential treatment illustrated in FIG. 3 would not be possible because having the same global title address of 919-460-2111 would be global title translated to the same destination. The present invention allows messages having the same global title address to be sent to different destinations based on the origin of the messages.

Figure 4:
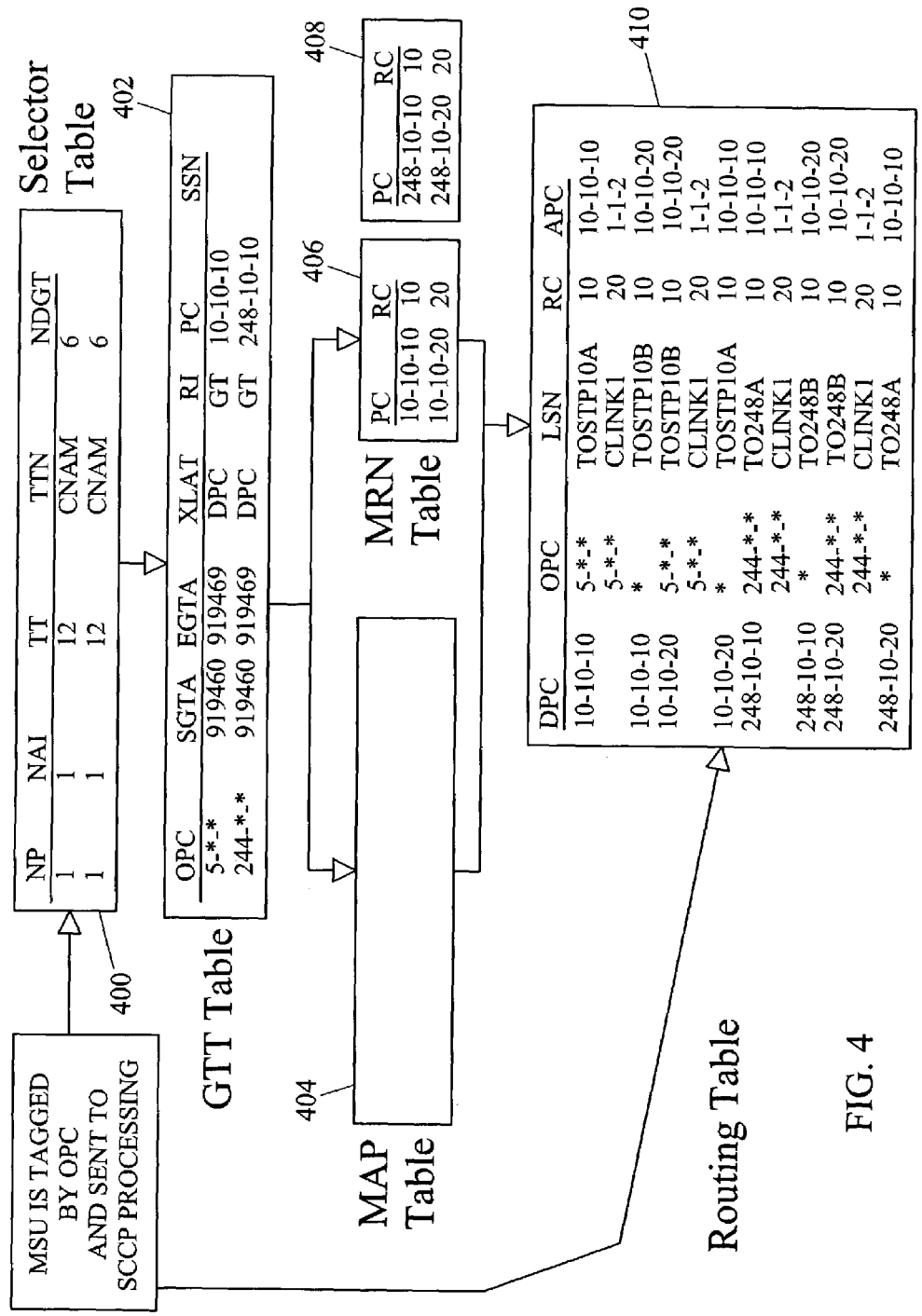
FIG. 4 is a data structure diagram illustrating exemplary data structures for the message-origination-based intermediate GTT example illustrated in FIG. 2.

FIG. 4 illustrates an example of GTT tables that may be used by STP 100 in FIG. 2 in performing OPC-based intermediate GTT according to the present invention. In FIG. 4, the GTT tables include a selector table 400 for selecting the appropriate service for a received message, a global title translation table 402 for performing intermediate OPC-based global title translation according to an embodiment of the present invention, a MAP table 404, and routing tables 406, 408, and 410 for routing messages after they are global title translated. In FIG. 4, selector table 400 includes parameters such as the numbering plan, nature of address, and translation type used to select an appropriate service type for a received message. In the illustrated example, the service types are all CNAM. However, other service types may be provisioned in selector table 400 without departing from the scope of the invention.

Global title translation table 402 includes an OPC field, start and end global title address fields, a translation field, a routing indicator field, a point code field, and a subsystem number field. It should be noted that in table 402, entries having the same range of global title addresses but different OPCs will be global title translated to yield different destination point codes. MAP table 404 is not used for intermediate GTT. Hence, a description thereof will not be presented herein. MRN tables 406 and 408 include point code and route cost fields used to make routing decisions based on route calls. Routing table 410 includes a DPC field, an OPC field, a linkset name field, a route cost field, and an adjacent point code field. The DPC field stores a DPC value used to select an outbound linkset for a message. The OPC field stores OPC values that may be used to select an outbound linkset, as described in the above-referenced parent application. The linkset name field stores identifiers for linksets to be selected for outbound message routing. The route cost field contains a cost associated with each route. Finally, the adjacent point code field stores the point code of a node at the far end of a signaling link.

As shown in FIG. 4, the OPC qualifier in the GTT table allows the network operator to select a different intermediate DPC for the same service type-GTA combination. In addition, the linkset selected in the routing table may also depend on the OPC. Thus, there is a two-fold effect for OPC routing of GTT messages. First, the DPC can be selected by OPC, and then, the route taken to the DPC can be dependent on the OPC.

Figure 5:
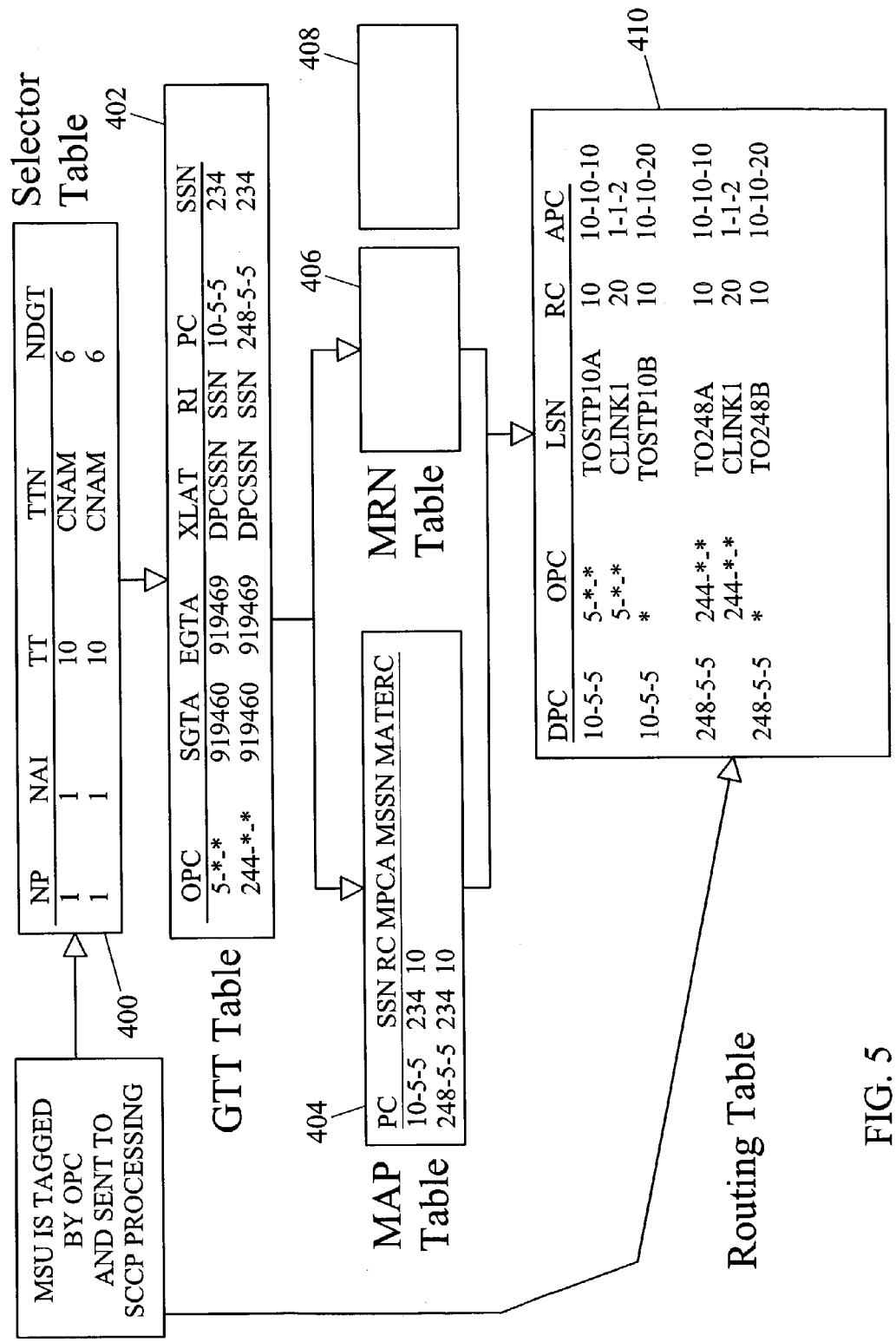
FIG. 5 is a data structure diagram illustrating exemplary data structures for the message-origination-based final GTT example illustrated in FIG. 3.

FIG. 5 illustrates exemplary GTT tables that may be used by STP 100 illustrated in FIG. 3 in performing final GTT according to the present invention. The difference between intermediate and final global title translation can be shown by comparing table 402 illustrated in FIG. 4 with table 402 illustrated in FIG. 5. As illustrated in FIG. 4, table 402 includes point codes 10-10-10 corresponding to STP 116B and 248-10-10-10 corresponding to STP 112A. In addition, GTT table 402 illustrated in FIG. 4 contains a translation identifier of GTT. Thus, STPs 112A and 116A upon receiving messages that were global title translated by STP 100 using table 402 illustrated in FIG. 4 would be required to perform a final global title translation. In contrast, in GTT table 402 illustrated in FIG. 5, the point codes to be inserted in global title translated messages are 10-5-5 and 248-5-5, which correspond to SCPs 118 and 114 illustrated in FIG. 3. In addition, the routing indicator is DPC/SSN, indicating that any subsequent STPs in a network are to simply MTP route the messages rather than performing global title translation.

As shown in FIG. 5, the OPC qualifier in the GTT table allows the network operator to select a different final DPC-SSN for the same service type-GTA combination. In addition, the linkset selected in the routing table may also depend on the OPC. Thus, there is a two-fold effect for OPC routing of GTT messages. First, the DPC is selected by OPC, and then, the route taken to the DPC is dependent on the OPC.

Figure 6:
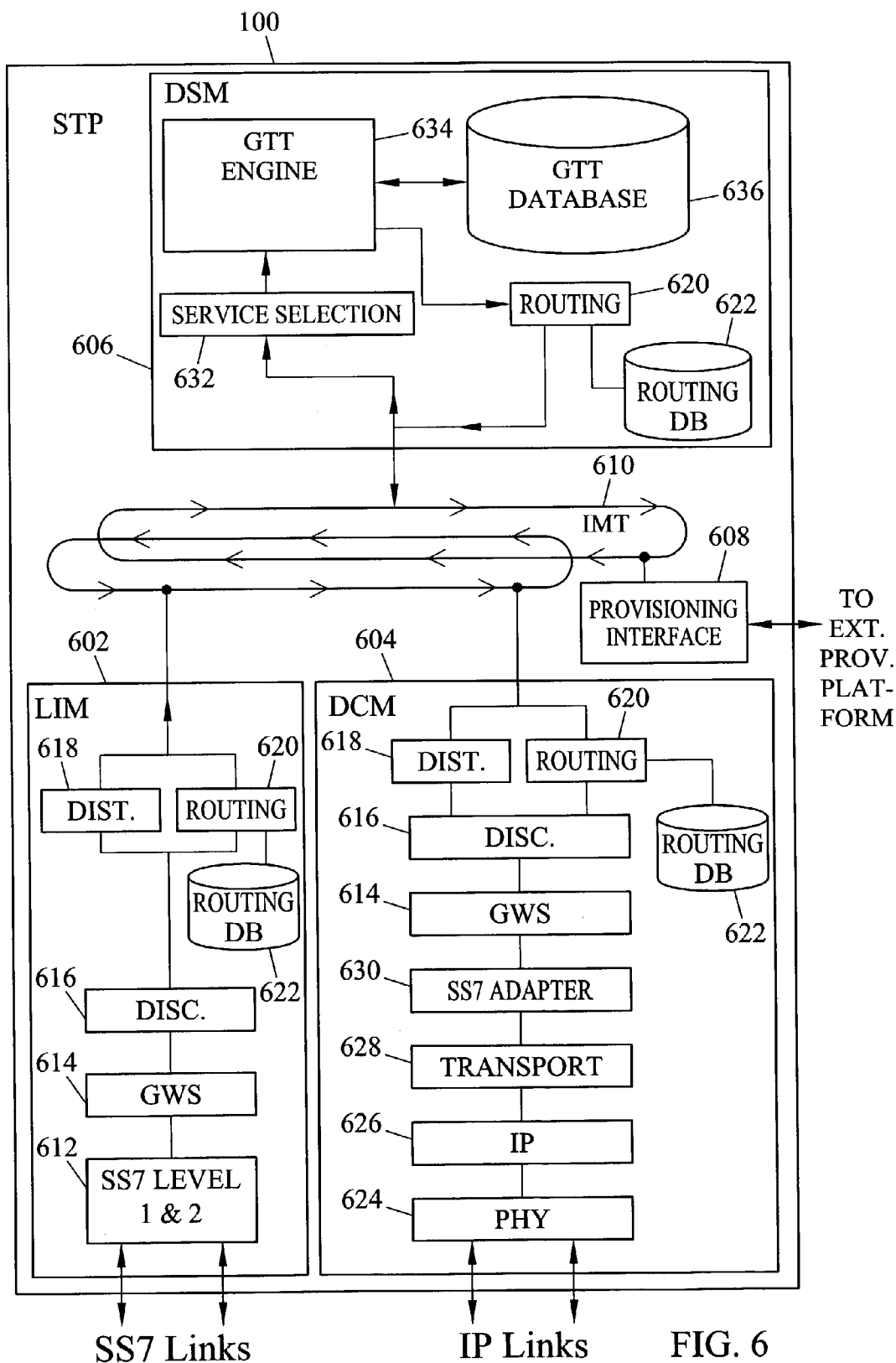
FIG. 6 is a block diagram illustrating exemplary components of a signal transfer point for implementing message-origination-based global title translation according to an embodiment of the present invention.

FIG. 6 illustrates a signal transfer point for performing message origination based global title translation according to an embodiment of the present invention. Referring to FIG. 6, signal transfer point 100 includes a plurality of internal processing modules for routing and processing SS7 messages. In the illustrated example, signal transfer point 100 includes a link interface module 602 for sending and receiving SS7 messages via SS7 signaling links, a data communications module 604 for sending and receiving SS7 message via IP signaling links, a database services module 606 for performing database related services, and a provisioning interface 608 for allowing an external system to provision databases within STP 100. In the illustrated example, modules 602, 604, 606, and 608 are connected via a counter-rotating, dual-ring bus 610.

SS7 link interface module 602 includes an SS7 level one and two module 612 for performing SS7 level one and two functions, such as error detection, error correction, and sequencing of SS7 messages. Gateway screening module 614 determines whether to allow messages into a network. Discrimination module 616 analyzes destination point codes in a message to determine whether further processing is required for the messages or whether the messages are to be through-switched. Distribution module 618 distributes messages identified by discrimination module 616 as requiring further processing to other internal processing modules for the processing to be performed. Routing module 620 routes messages identified by discrimination module 616 as being destined for other signaling nodes. Routing module 620 may access a routing database 622 to route the messages.

Data communications module 604 includes a physical layer 624 for performing physical layer functions for IP signaling links. Internet protocol layer 626 performs IP layer functions, such as IP forwarding. Transport layer 628 performs transport layer functions, such as TCP or SCTP functions. SS7 adapter layer 630 performs functions for adapting SS7 traffic to be sent and/or received over an IP network. Gateway screening module 614, distribution module 618, routing module 620, and routing database 622 perform the same functions as those described above with regard to LIM 602. Hence a description of these functions will not be repeated herein.

Database services module 606 includes a service selection module 632 for selecting a service for messages identified as requiring further internal processing. For purposes of explanation of the present invention, the selected service is assumed to be global title translation. Service selection may be performed based on one or more SCCP parameters in a signaling message, such as translation type, nature of address indicator, routing indicator, global title indicator, number plan, etc. Global title translation engine 634 performs global title translation based on the called party address and the originating point code in a received signaling message. Global title translation database 636 may include the data structures described above for performing intermediate and final global title translation using the originating point code. Routing function 620 and routing database 622 perform similar functions to those described with regard to LIM 602. Hence, a description thereof will not be repeated herein.

Figure 7:
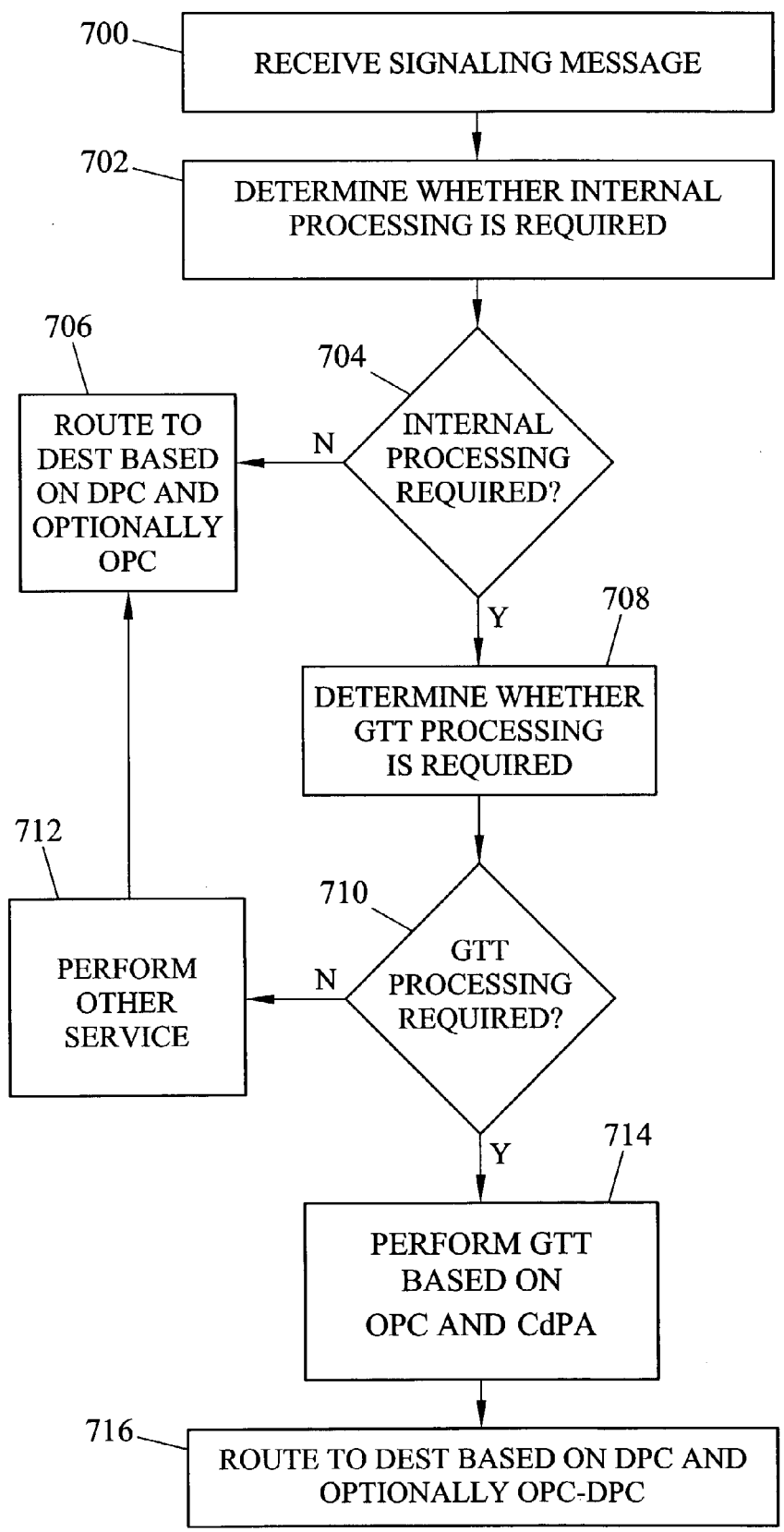
FIG. 7 is a flow chart illustrating exemplary steps performed by the signal transfer point in FIG. 6 in performing message-origination-based global title translation according to an embodiment of the present invention.

FIG. 7 is a flow chart illustrating exemplary steps performed by STP 100 in performing message-origination-based global title translation according to an embodiment of the present invention. Referring to FIG. 7, in step 700, STP 100 receives a signaling message. In step 702, discrimination module 616 determines whether further internal processing is required. In step 704, if further internal processing is not required, control proceeds to step 706 where the message is routed to its intended destination based on the destination point code and optionally the originating point code-destination point code combination. In step 704, if discrimination module 616 determines that further internal processing is required, the message is forwarded to DSM 606 and service selection module 632 determines whether GTT processing is required. In step 710, if GTT processing is not required, control proceeds to step 712 where another selected service is performed for the message and the message is routed to its intended destination. In step 710, if GTT processing is determined to be required, control proceeds to step 714 where global title translation engine 634 performs global title translation based on the OPC and the called party address in the message. The destination point code from the global title translation is then inserted in the message, and control proceeds to step 716 where the message is routed to its intended destination based on the DPC and optionally the OPC-DPC combination.

Thus, as described above, the present invention includes methods and systems for message origination based global title translation. Such flexible global title translation allows network operators to contract with other network operators for selective global title translation and routing of signaling messages based on originating point codes. For example, global title translation can be used to ensure that messages from network A are sent to a particular database providing a higher quality of service than messages from network B., even though the messages from networks A and B have the same global title address. In addition, such source-based GTT according to the present invention can be used in combination with the OPC-based linkset selection described in the Parent Application to select among multiple linksets connected to the same destination. By providing such flexible GTT and routing, the present invention allows service providers to specify and contract with other service providers on exactly how traffic from a particular source will be treated.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for global title translation in a telecommunications network comprising:
 (a) receiving a signaling message;
 (b) determining whether the signaling message requires global title translation; and
 (c) in response to determining that the signaling message requires global title translation, performing a lookup in a global title translation database, wherein performing the lookup in the global title translation database includes performing the lookup based on a called party address and an originating point code extracted from the signaling message.

2. The method of claim 1 wherein receiving a signaling message includes receiving an SS7 signaling message.

3. The method of claim 1 wherein receiving a signaling message includes receiving a signaling message requiring intermediate global title translation.

4. The method of claim 1 wherein receiving a signaling message includes receiving a signaling message requiring final global title translation.

5. The method of claim 1 wherein determining whether the signaling message requires global title translation includes analyzing a signaling connection control part of the signaling message.

6. The method of claim 1 wherein performing a lookup in the global title translation database based on the called party address and the originating point code includes selecting among multiple entries in the global title translation database having the same called party address using the originating point code.

7. The method of claim 1 comprising extracting a destination point code from the global title translation database based on the called party address and the originating point code and inserting the destination point code in the signaling message.

8. The method of claim 7 comprising routing the signaling message to a destination based on the destination point code.

9. The method of claim 1 comprising selecting among multiple entries in the global title translation database having the same global title address using the originating point code, inserting a destination point code from the selected entry in the signaling message, and selecting an outbound signaling linkset to the destination point code based on the destination point code and the originating point code.

10. A method for controlling message processing between telecommunications service providers, the method comprising:
 (a) establishing a first agreement between telecommunications service providers such that signaling messages addressed to a first global title address and originating from a first network are global title translated to a destination address in a second network;

(b) establishing a second agreement between the telecommunications service providers such that signaling messages addressed to the first global title address and originating from a third network are global title translated to a destination address in a fourth network; and (c) provisioning a global title translation database at a node between the first and third networks and the second and fourth networks to implement the first and second agreements.

11. The method of claim 10 wherein the signaling messages include SS7 messages requiring database services.

12. The method of claim 10 wherein the destination addresses in the second and fourth networks comprise addresses of final destinations for the signaling messages.

13. The method of claim 10 wherein the destination addresses in the second and fourth networks comprise addresses of nodes configured to perform final global title translation for the signaling messages.

14. The method of claim 10 wherein provisioning a global title translation database at a node between the first and third networks and the second and fourth networks includes provisioning the global title translation database at a signal transfer point.

15. The method of claim 10 wherein provisioning a global title translation database at a node between the first and third networks and the second and fourth networks includes provisioning the global title translation database at an SS7/IP gateway signal transfer point.

16. The method of claim 10 provisioning a global title translation database at a node between the first and third networks and the second and fourth networks includes provisioning the global title translation database at a service control point.

17. The method of claim 10 wherein provisioning the global title translation database to implement the first and second agreements includes provisioning address translations in the database such that signaling messages having originating point codes corresponding to the first network and having the first global title address translate to a destination point code in the second network and such that signaling messages having originating point codes corresponding to the third network and having the first global title address translate to a destination point code in the fourth network.

18. The method of claim 10 comprising provisioning a routing table in the node such that signaling messages addressed to the same destination are forwarded over different linksets to the destination based on originating addresses in the signaling messages.

19. A system for global title translation in a telecommunications network, the system comprising:

(a) a communications link module for sending signaling messages to and receiving signaling messages from a network;

(b) a discrimination application operatively associated with the communications link module for identifying messages requiring further processing; and (c) a global title translation engine operatively associated with the discrimination module for receiving the messages requiring further internal processing, for determining whether global title translation is required for the messages, and for performing a lookup in a global title translation database based on a called party address and an originating point code in each of the signaling messages for which GTT is required.

20. The system of claim 19 wherein the communications link module comprises an SS7 link interface module.

21. The system of claim 19 wherein the discrimination application examines a destination point code in the signaling messages to determine whether further processing is required.

22. The system of claim 19 wherein the global title translation engine selects among multiple entries in the global title translation database having the same global title address based on the originating point code.

23. The system of claim 22 wherein the global title translation engine inserts the destination point code from the selected entry in each signaling message for which GTT is required.

24. The system of claim 22 comprising a routing engine for routing the message to its intended destination based on the destination point code.

25. The system of claim 24 wherein the routing engine selects an outbound linkset to the destination point code for each signaling message for which GTT is required based on the destination point code and the originating point code in each signaling message.

* * * * *